(12) United States Patent
Suzuki et al.

(10) Patent No.: US 6,655,809 B2
(45) Date of Patent: Dec. 2, 2003

(54) SPREAD ILLUMINATING APPARATUS (75) Inventors: Shingo Suzuki, Iwata-gun (JP); Koichi Toyoda, Iwata-gun (JP)

(73) Assignee: Minebea, Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/769,295

(22) Filed: Jan. 26, 2001

(65) Prior Publication Data
US 2001/0017773 A1 Aug. 30, 2001

(30) Foreign Application Priority Data
Feb. 8, 2000 (JP) ........................................ 2000-030541

(51) Int. Cl.$^7$ ................................................ F21V 7/04
(52) U.S. Cl. ........................... 362/31; 362/551; 362/26; 362/331
(58) Field of Search .......................... 362/31, 26, 551, 362/556, 331

(56) References Cited

U.S. PATENT DOCUMENTS

| | | | | |
|---|---|---|---|---|
| 5,237,638 A | * | 8/1993 | Narcisco, Jr. | 385/123 |
| 5,664,863 A | * | 9/1997 | Cassarly et al. | 362/293 |
| 5,857,761 A | | 1/1999 | Abe et al. | |
| 5,915,855 A | | 6/1999 | Murase et al. | |
| 6,283,602 B1 | * | 9/2001 | Kawaguchi et al. | 362/31 |
| 6,431,716 B1 | * | 8/2002 | Kusakabe | 362/31 |

FOREIGN PATENT DOCUMENTS

| | | | |
|---|---|---|---|
| JP | 11-242222 | * | 9/1999 |
| WO | WO 90/04132 | * | 4/1990 |

* cited by examiner

*Primary Examiner*—Sandra O'Shea
*Assistant Examiner*—Hargobind S. Sawhney
(74) *Attorney, Agent, or Firm*—Oliff & Berridge, PLC (57) ABSTRACT

There is provided a spread illuminating apparatus which is improved in terms of compactness. A light guiding member (15) provided with a curve (20) is disposed between an end (5a) of a light conductive member (5) and a spot-like light source (6). Light beams from the spot-like light source (6) which travel in the direction orthogonal to an electric wiring board (17) are directed toward the end (5a) of the light conductive member (5) (in the direction parallel with the electric wiring board (17)) to be properly guided while reflected at the curve (20). Since the light beams from the spot-like light source (6) are properly guided, the light beams from the spot-like light source (6) can enter the light conductive member (5) with the spot-like light source (6) and the light conductive member (5) not disposed on the same plane. Therefore, the spot-like light source (6) can be arranged with less restrictions, thereby enabling the spot-like light source (6) to be disposed on the electric wiring board (17) together with other electronic components. Accordingly, in comparison with the conventional art in which the spot-like light source can not be disposed on the electric wiring board together with other electronic components requiring separate circuits to be provided, the apparatus can be improved in terms of compactness.

3 Claims, 7 Drawing Sheets

SPREAD ILLUMINATING APPARATUS

BACKGROUND OF THE INVENTION

1. Field of the Invention

The present invention relates to a spread illuminating apparatus used as an illuminating means for signboards, various kinds of reflection-type displays, etc., and more particularly to a spread illuminating apparatus used as an illuminating means for a liquid crystal display.

2. Description of the Related Art

A demand for a liquid crystal display as a display mainly for computers has been increased since the liquid crystal display which operates on low power consumption is characterized by being thin and light weighted and so on. Since a liquid crystal which is a component member of the liquid crystal display does not emit light by itself, an illuminating means for viewing an image is required unlike a light emitting element such as a picture tube. In particular, in the recent demand for thinner devices, there has been a growing tendency to employ a spread illuminating apparatus of a side light type (light conductive member type) that is thin plate-like as an illuminating means for illuminating the liquid crystal display.

Figure 6:
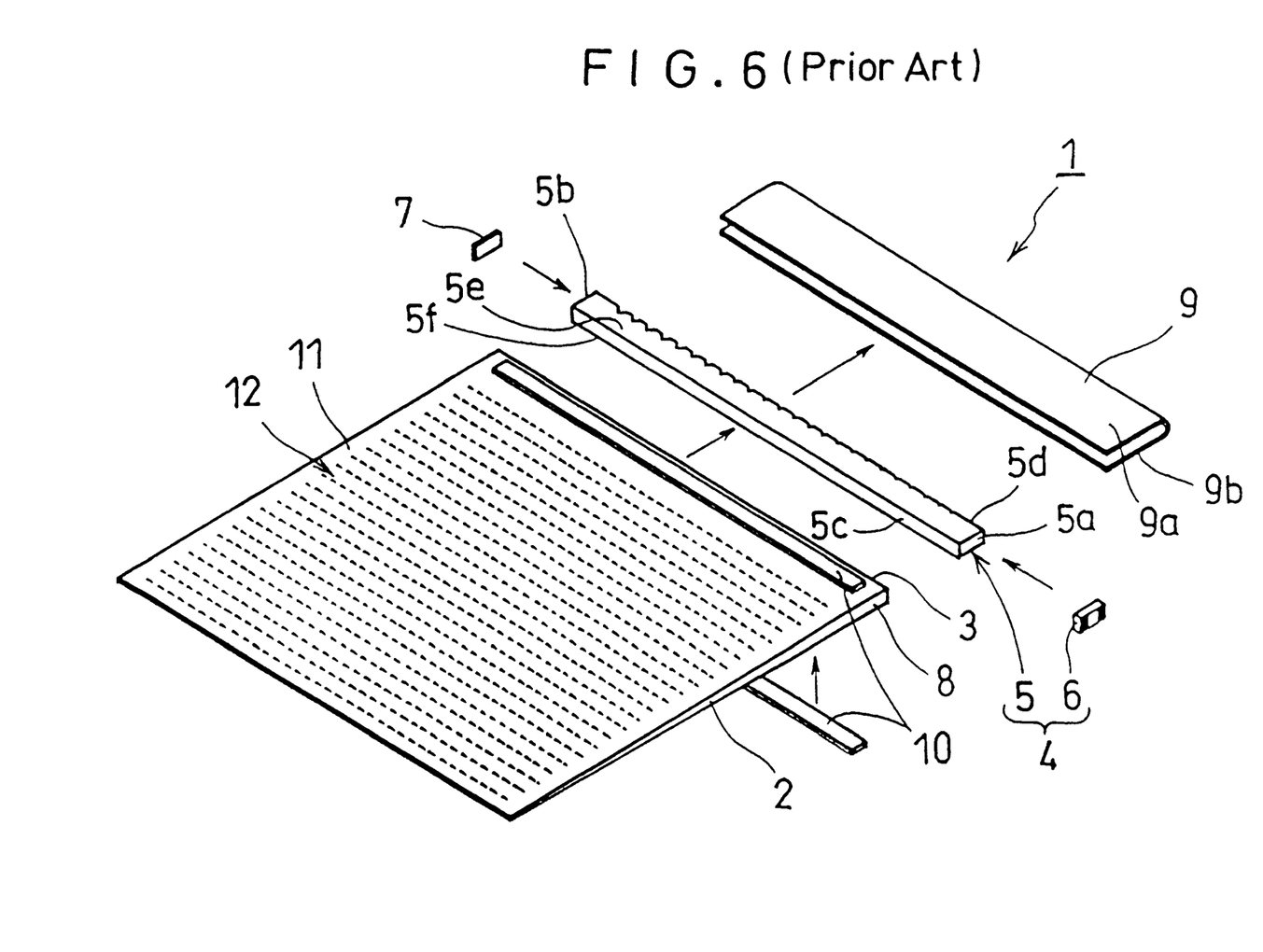
FIG. 6 is an exploded perspective view showing an example of a conventional spread illuminating apparatus.
Figure 7:
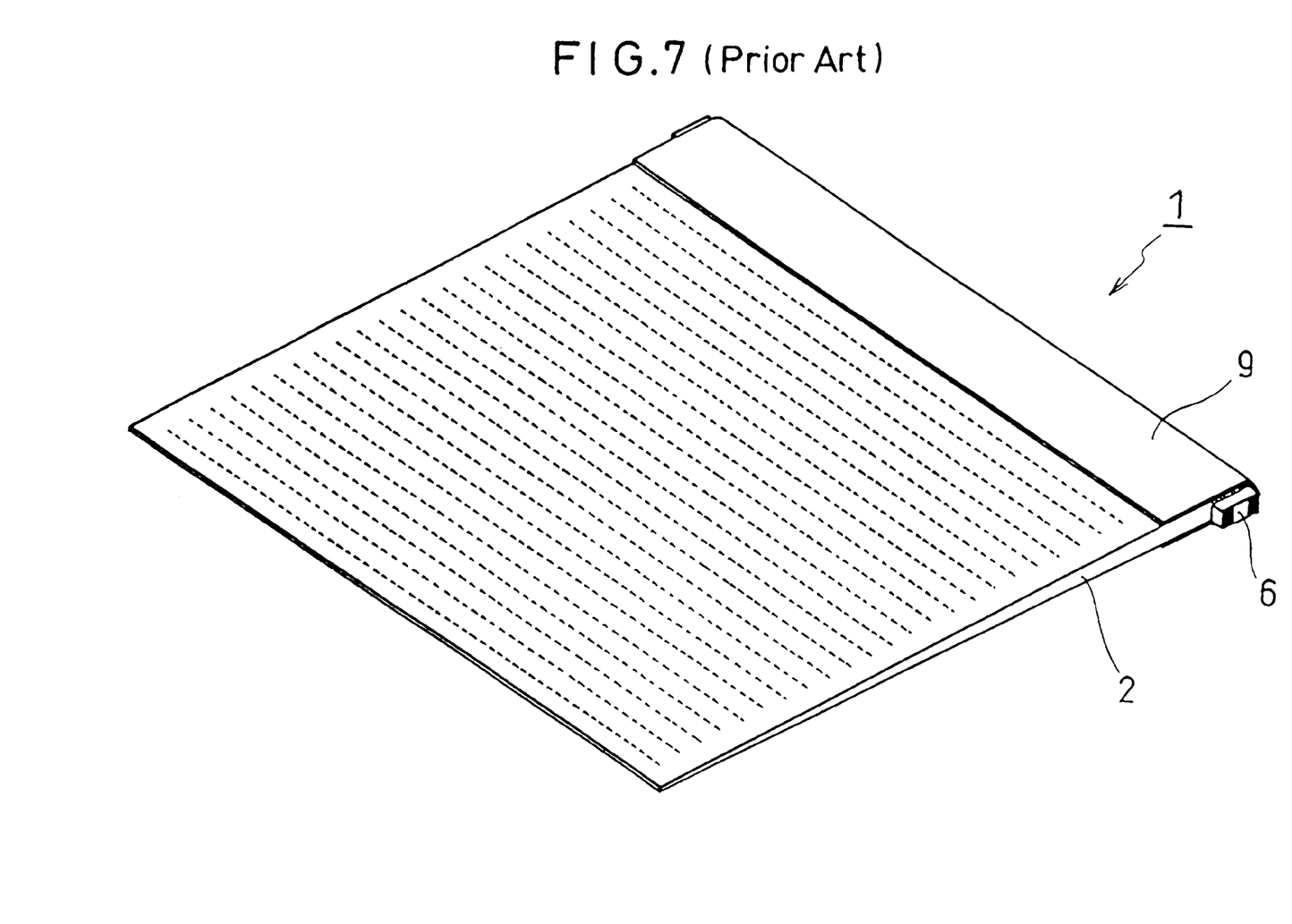
FIG. 7 is a perspective view showing the spread illuminating apparatus of FIG. 6 in its assembled state.

An example of such a side light type spread illuminating apparatus is shown in FIGS. 6 and 7.

In FIGS. 6 and 7, a spread illuminating apparatus 1 is, in general, constituted such that a bar-like light source 4 is disposed close to an end surface 3 of a transparent substrate 2 formed of a light-transmissible material. The transparent substrate 2 is formed in a wedge-shape, in which the thickness is in inverse proportion to the increase in the distance from the end surface 3 and gradually decreases.

The light source 4 is, in general, composed of alight conductive member 5 and a spot-like light source 6. The light conductive member 5 is made of a transparent material, formed in a long plate and disposed close to and along the end surface 3 of the transparent substrate 2, and the spot-like light source 6 is composed of an LED disposed facing one end 5a of the light conductive member 5. A reflection plate 7 is disposed facing the other end 5b of the light conductive member 5.

Further, a light reflection member 9, which is U-shaped, is disposed in such a manner as to cover longitudinal peripheral surfaces of the light conductive member 5 except a surface 5c (first surface of the light conductive member) facing the transparent substrate 2 [covered are a surface 5d (second surface of the light conductive member) opposite to the first surface 5c of light conductive member and two surfaces extending in the longitudinal direction and being orthogonal to and continuous with the second surface 5d of the light conductive member (one on the upper side in FIG. 6 is referred to as third surface 5e of the light conductive member and one on the lower side in FIG. 6 is referred to as fourth surface 5f of the light conductive member)] and a portion 8 (transparent substrate proximal portion) positioned toward the end surface 3 of the transparent substrate 2.

A double-faced adhesive tape 10 is placed between the transparent substrate proximal portion 8 and opposing plates 9a and 9b of the light reflection member 9, which oppose each other, so that the light reflection member 9 is fixed to the transparent substrate proximal portion 8.

A light reflection pattern 12 is formed on a surface 11 of the transparent substrate 2 (the upper side in FIG. 6, hereinafter referred to as upper surface), and thus the brightness is almost uniform everywhere on the transparent substrate 2 irrespective of the distance from the light conductive member 5.

In the spread illuminating apparatus, it is desired that the spot-like light source be disposed on an electric wiring board (not shown) together with other electronic components in order to make the apparatus compact.

However, according to the conventional art described with reference to FIGS. 6 and 7, a reflection-type liquid crystal display element or the like are disposed under the spread illuminating apparatus, so there necessarily exists a distance equal to the thickness of the liquid crystal display element or the like between the spread illuminating apparatus and the electric wiring board. Therefore, it is difficult to dispose the spot-like light source 6 composed of an LED on the electric wiring board (not shown) together with other electronic components (electronic components used for electronic equipment provided with the liquid crystal display element, not shown). Thus, separate wiring paths have to be provided. In the above-described conventional art, since the separate wiring paths are provided, the circuit structure is complicated, which hinders the apparatus from becoming compact.

SUMMARY OF THE INVENTION

The present invention has been made in view of the above, and an object of the present invention is therefore to provide a spread illuminating apparatus which is improved in terms of compactness.

According to a first aspect of the present invention, there is provided a spread illuminating apparatus having a bar-like light source disposed along and in the vicinity of an end surface of a transparent substrate made of a transparent material, characterized in that the light source is composed of a light conductive member which is made of a transparent material, formed bar-like and disposed close to and along at least one end surface of the transparent substrate, and a spot-like light source which is disposed at at least one end of the light conductive member, and that a light guiding member which can change the direction of light beams is provided between the end of the light conductive member and the spot-like light source.

According to a second aspect of the present invention, in the spread illuminating apparatus of the first aspect of the present invention, the light guiding member is formed integrally with the light conductive member 5.

According to a third aspect of the present invention, in the spread illuminating apparatus of the first aspect of the present invention, the light guiding member is formed separately from the light conductive member.

According to a fourth aspect of the present invention, in the spread illuminating apparatus of the third aspect of the present invention, the light guiding member is comprised of at least one optical fiber.

According to a fifth aspect of the present invention, in the spread illuminating apparatus of any one of the first to third aspects of the present invention, the light guiding member is provided with a means for increasing reflection which improves light reflectance.

DETAILED DESCRIPTION OF THE PREFERRED EMBODIMENTS

A spread illuminating apparatus 1A according to a first embodiment of the present invention will be described with reference to FIGS. 1 and 2. Note that parts and components identical with those in FIGS. 6 and 7 are designated by the same reference symbols and the description thereof is appropriately omitted.

The spread illuminating apparatus 1A is in general composed such that a bar-like light source 4 is disposed close to an end surface 3 (light incident surface) of a transparent substrate 2 made of a transparent material. For instance, it is disposed in such a manner as to cover a screen of a reflection-type liquid crystal display element (not shown), and is used as an auxiliary illuminating apparatus therefor.

The transparent substrate 2 is formed in a wedge-shape, in which the thickness is inversely proportional to the increase in distance from the end surface 3 and gradually decreases.

A light reflection pattern 12 is formed on a surface 11 of the transparent substrate 2 (the upper side in FIG. 1, hereinafter referred to as upper surface). The light reflection pattern 12 is composed of a number of grooves 13 each of which has a substantially triangular shape in section, and flat portions 14 each of which is formed between two adjacent grooves 13. Thus, the light reflection pattern 12 is arranged such that the brightness is almost uniform everywhere on the transparent substrate 2 irrespective of the distance from the light conductive member 5, and that the ratio of the width (occupied area) of the groove 13 to the width (occupied area) of the flat portion 14 increases in proportion to the increase in distance from the end surface 3.

The grooves 13 of the light reflection pattern 12 formed on the transparent substrate 2 are so fine that the grooves 13 do not make an obstruction to viewing screen.

The light source 4 is in general composed of the light conductive member 5 made of a transparent material, formed bar-like and disposed close to the end surface 3 of the transparent substrate 2, a spot-like light source 6 made of an LED disposed facing one end 5a of the light conductive member 5 and a light guiding member 15 to be described later. A reflection plate 7 is disposed facing the other end 5b of the light conductive member 5.

An optical path conversion means 16 is provided on a second surface 5d of the light conductive member 5. The optical path conversion means 16 is composed of grooves 16a each of which is substantially triangular in section, and flat portions 16b each of which is formed between any two grooves 16a adjacent to each other.

Light beams which travel inside the light conductive member 5 and are reflected at the second surface 5d of the light conductive member have a tendency, when reflected at the grooves 16a, to travel substantially perpendicular to a first surface 5c of the light conductive member due to inclined surfaces (not shown) constituting the grooves 16a, and a larger amount of light penetrates the first surface 5c of the light conductive member and resultingly travels into the transparent substrate 2 compared with the case where the light beams are reflected at the flat portions 16b. Accordingly, the ratio of the width (occupied area) of the groove 16a to the width (occupied area) of the flat portion 16b is set to gradually increase in proportion to the increase in distance from the end 5a of the light conductive member 5. At this point, the optical path conversion means 16 is formed in consideration of a relational balance between the distance from the spot-like light source 6 and the occupied area of the groove portion 16a, whereby the light beams are uniformly emitted from the first surface 5c of the light conductive member although the spot-like light source 6 is disposed at the end 5a.

In order to specifically vary the ratio of the occupied area of the groove 16a to the occupied area of the flat portion 16b as described above, the optical path conversion means 16 in this embodiment is set such that the interval (pitch) between any two grooves 16a adjacent to each other is kept constant while the depth of the groove 16a gradually increases in proportion to the increase in distance from the spot-like light source 6. Note that, although not shown in the figure, the optical path conversion means 16 may be set such that the depth of the groove 16a is kept constant while the interval (pitch) between two grooves 16a adjacent to each other gradually decreases to thereby vary the ratio of the occupied area of the groove portion 16a to the occupied area of the flat portion 16b.

Figure 1:
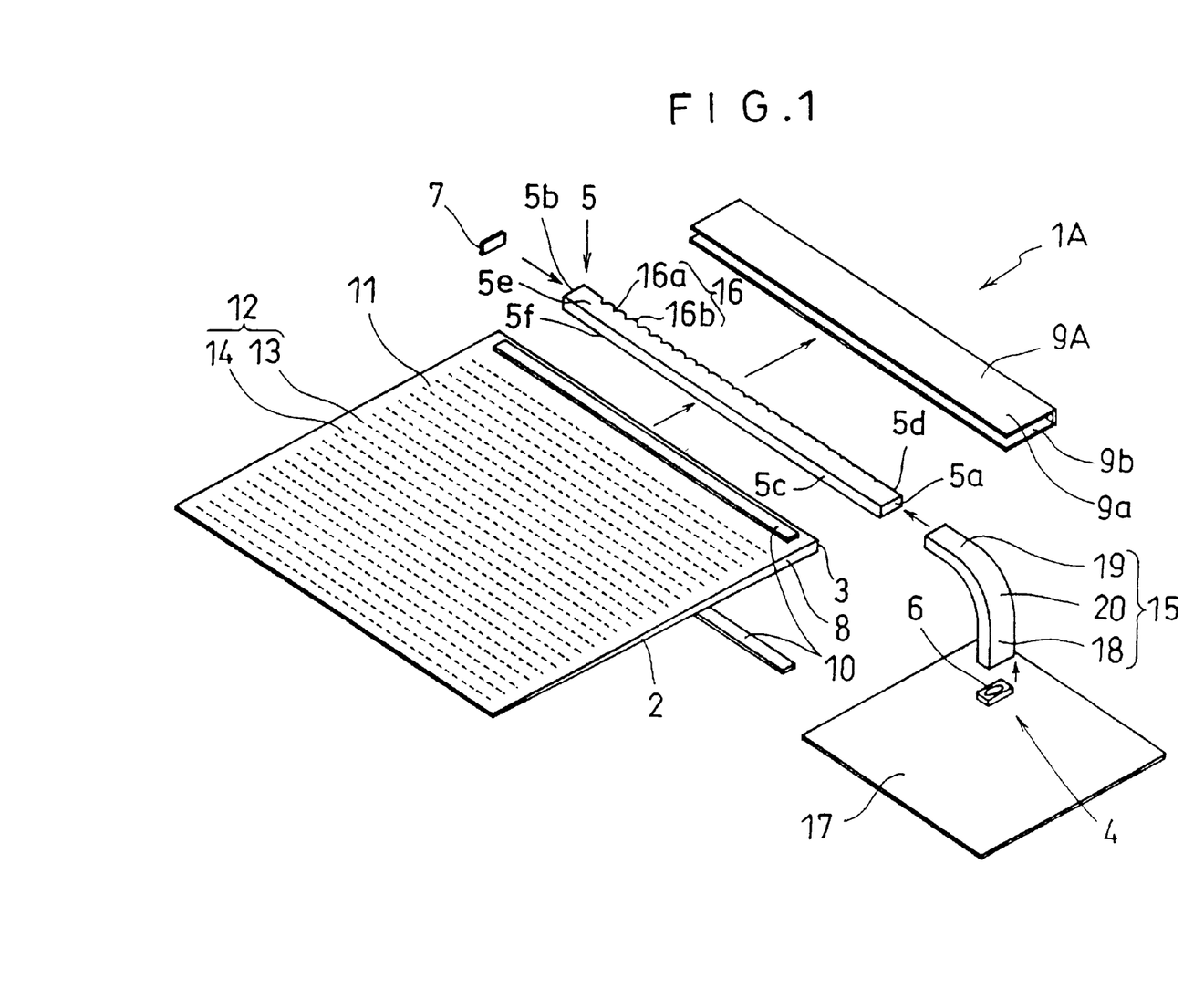
FIG. 1 is an exploded perspective view showing a spread illuminating apparatus according to a first embodiment of the present invention.
Figure 2:
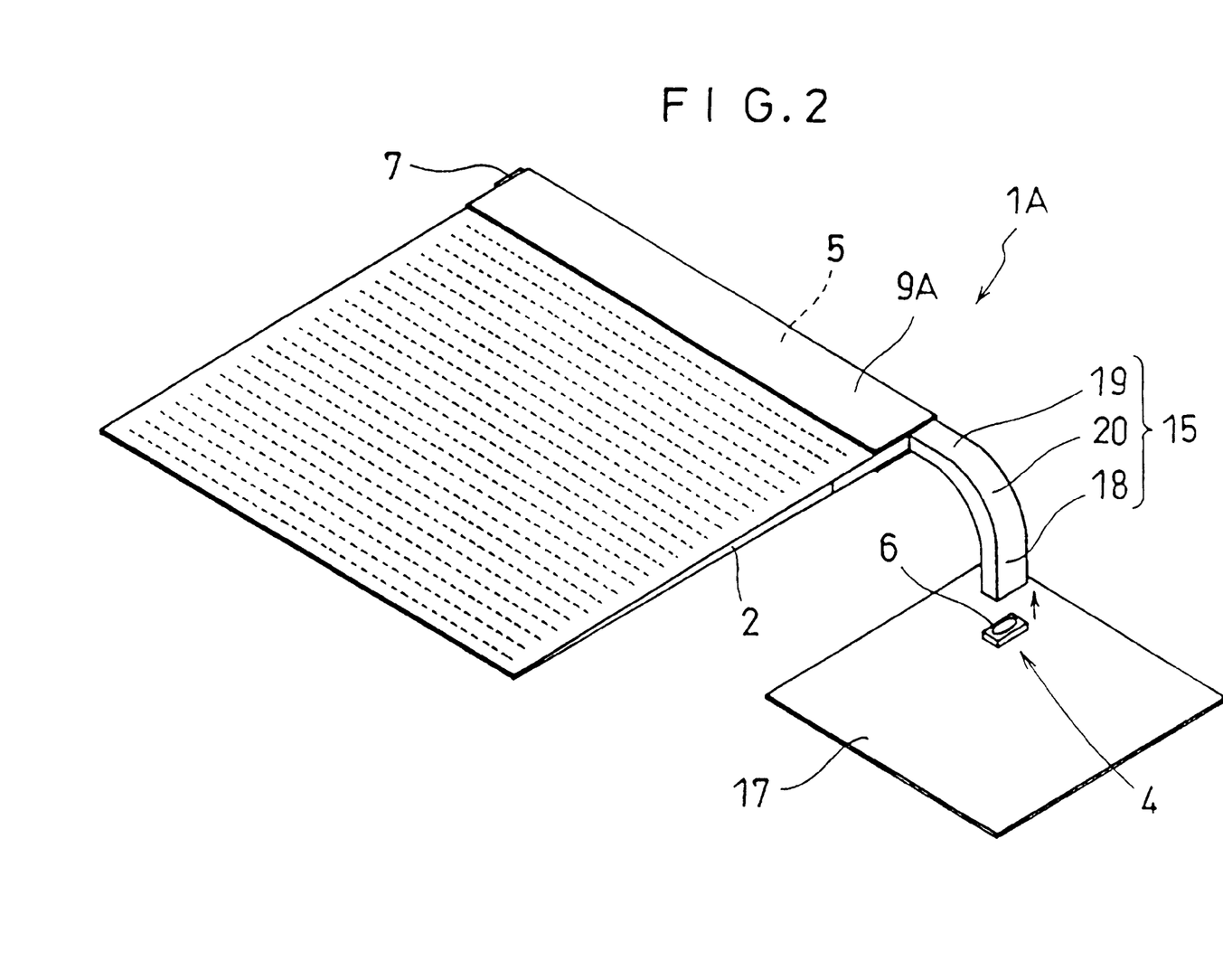
FIG. 2 is a perspective view showing the spread illuminating apparatus of FIG. 1 in its assembled state.

Further, a light reflection member 9A, which is substantially U-shaped, is disposed in such a manner as to cover longitudinal peripheral surfaces of the light conductive member 5 except a surface 5c (first surface of the light conductive member) facing the transparent substrate 2 [covered are a surface 5d opposite to first surface 5c of the light conductive member (second surface of the light conductive member) and two surfaces extending in the longitudinal direction and being orthogonal to and continuous with the second surface 5d of the light conductive member (one on the upper side in FIG. 1 is third surface 5e of the light conductive member and one on the lower side in FIG. 1 is fourth surface 5f of the light conductive member)] and a portion 8 (transparent substrate proximal portion) positioned toward the end surface 3 of the transparent substrate 2.

A double-faced adhesive tape 10 is placed between the transparent substrate proximal portion 8 and opposing plates 9a and 9b of the light reflection member 9A, which oppose each other, so that the light reflection member 9A is fixed to the transparent substrate proximal portion 8.

The spot-like light source 6 composed of an LED is disposed on an electric wiring board 17 together with electronic components not shown in the figure. In this embodiment, the electric wiring board 17 is disposed parallel with the light conductive member 5. A light guiding member 15 is provided between the end 5a of the light conductive member 5 and the spot-like light source 6.

The light guiding member 15 is in general composed of a rectangular plate-like wing 18 provided facing the spot-like light source 6, a rectangular plate-like wing 19 provided facing the light conductive member 5 and a curve 20 connecting the wing 18 and the wing 19. The wing 18 and the wing 19 are connected with each other through the curve 20 in such a manner as to form a predetermined angle (obtuse angle in this embodiment). The end surface of the wing 18 faces the spot-like light source 6 and the end surface of the wing 19 faces the end 5a of the light conductive member 5. In this state, the wing 18 is substantially orthogonal to the electric wiring board 17, and the wing 19 is oriented as extending from the light conductive member 5 (in parallel with the electric wiring board 17).

The light guiding member 15 is structured such that the wing 18 and the wing 19 are connected to the curve 20, respectively, to make a predetermined angle so that light beams which travel from the spot-like light source 6 toward the upper side in FIG. 1 (in the direction orthogonal to the electric wiring board 17) are directed toward the end 5a of the light conductive member 5 (in the direction parallel with the electric wiring board 17) due to reflection at the curve 20.

In the spread illuminating apparatus 1A structured as described above, the light beams, which are emitted from the spot-like light source 6 and travel in the direction orthogonal to the electric wiring board 17, are reflected at the curve 20 and emitted from the wing 19 in such a manner as to travel in parallel with the electric wiring board 17, and then enter the light conductive member 5.

As described above, the light guiding member 15 is provided between the end 5a of the light conductive member 5 and the spot-like light source 6 to thereby convert the direction of the light beams from the spot-like light source 6. Thus the light beams from the spot-like light source 6 enter the light conductive member 5 with the spot-like light source 6 not disposed on the same plane as the light conductive member 5. Therefore, the spot-like light source 6 is subject to less restrictions in arrangement, enabling the spot-like light source 6 and other electronic components (not shown) to be disposed on the same electric wiring board 17.

In the conventional art shown in FIGS. 6 and 7, it is difficult to dispose the spot-like light source 6 on an electric wiring board together with other electronic components (not shown), and separate wiring paths have to be provided making the circuit structure complicated. On the other hand, according to this embodiment, the spot-like light source 6 and other electronic components (not shown) may be disposed together on the same electric circuit board 17, whereby the separate wiring paths, which have had to be provided in the conventional art, are no longer required and the apparatus can be made compact.

Further, in the first embodiment (FIG. 1 and FIG. 2), the light guiding member 15 and the light conductive member 5 are separately formed. So, the variation of the position of the electric wiring board 17 can be accommodated by modifying only the shape of the light guiding member 15 with the shape of the light conductive member 5 kept intact. Therefore, the light conductive member 5 can be standardized and the productivity can be improved.

In the first embodiment (FIG. 1 and FIG. 2) described above, the light guiding member 15 and the light conductive member 5 are separately formed. Alternatively, a light guiding member 21 corresponding to the light guiding member 15 may be integrally formed with a light conductive member 5A as shown in FIG. 3 (hereinafter referred to as second embodiment).

The second embodiment is different from the first embodiment mainly in that the light conductive member 5A including the light guiding member 21 is provided in place of the light conductive member 5 and the light guiding member 15.

The light conductive member 5A is composed of a light conductive member proper 22 corresponding to the light conductive member 5 in the first embodiment and the light guiding member 21 connected with the light conductive member proper 22. The light guiding member 21 is in general composed of an extension 23 corresponding to the wing 19, a curve 24 corresponding to the curve 20 and a wing 25 corresponding to the wing 18 in the first embodiment, respectively. An end surface of the wing 25 faces the spot-like light source 6, where the wing 25 is made approximately normal to the electric wiring board 17.

Figure 3:
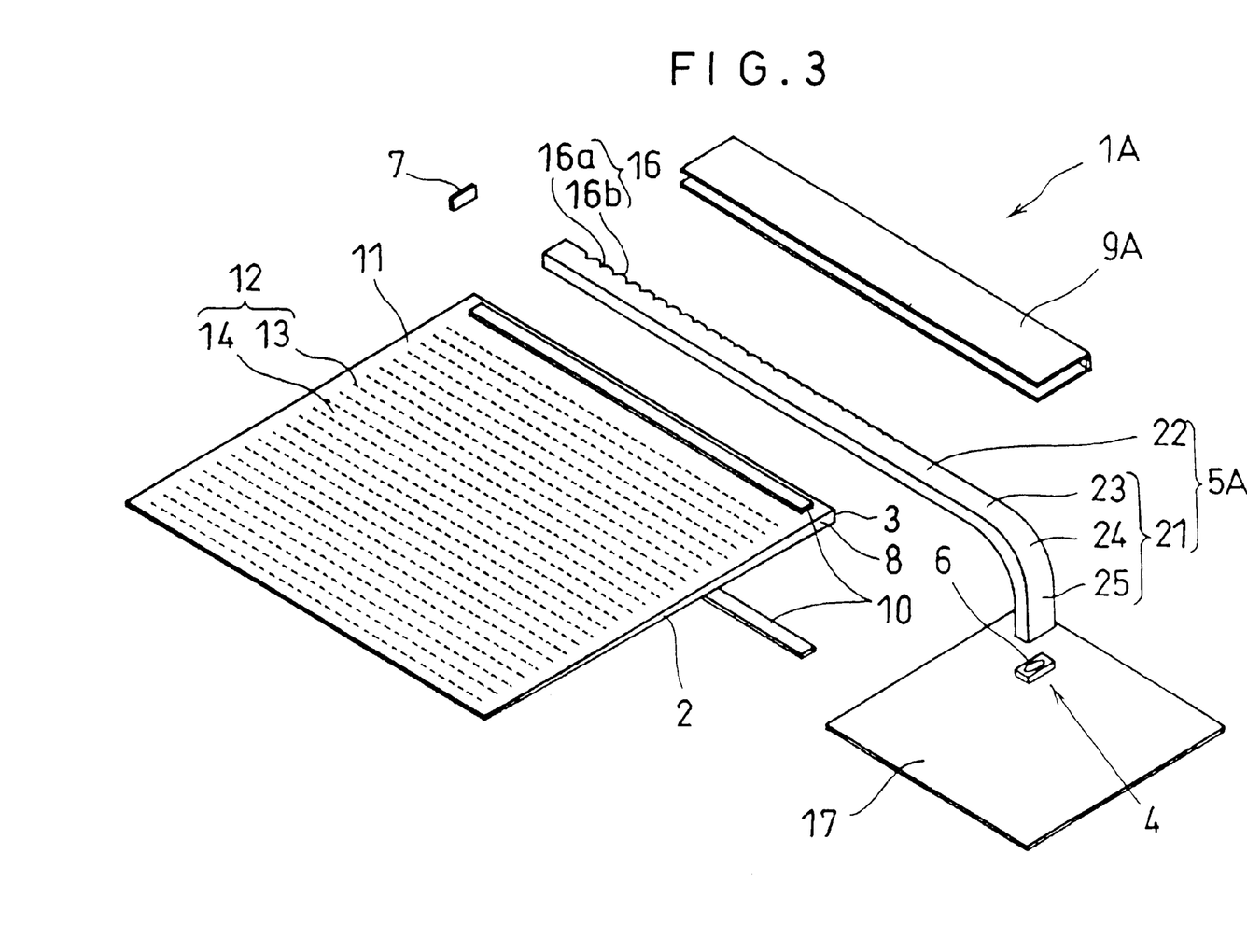
FIG. 3 is an exploded perspective view showing a spread illuminating apparatus according to a second embodiment of the present invention.

The light conductive member 5A is structured such that the extension 23 which extends from the light conductive member proper 22 and the wing 25 are connected with the curve 24, respectively, to make a predetermined angle so that light beams which travel from the spot-like light source 6 toward the upper side in FIG. 3 (in the direction orthogonal to the electric wiring board 17) are reflected at the curve 24 and guided toward the light conductive member proper 22 (in the direction parallel with the electric wiring board 17).

In the spread illuminating apparatus 1A structured as described above, the light beams, which are emitted from the spot-like light source 6 and travel in the direction orthogonal to the electric wiring board 17, are reflected at the curve 24 and emitted from the extension 23 in such a manner as to travel in parallel with the electric wiring board 17, then enter the light conductive member proper 22.

As described above, since the light guiding member 21 is provided to be located between the light conductive member proper 22 and the spot-like light source 6, that is, at a portion toward the spot-like light source 6 in the light conductive member 5A, and guides the light beams from the spot-like light source 6 into the light conductive member proper 22 with the spot-like light source 6 not disposed on the same plane as the light conductive member proper 22, the spot-like light source 6 is subject to reduced restrictions in arrangement, thereby enabling the spot-like light source 6 and other electronic components (not shown) to be disposed together on the electric wiring board 17.

In the second embodiment also, the circuit structure can be simplified as in the first embodiment. Therefore, the apparatus can be made further compact in comparison with the conventional art described above with reference to FIGS. 6 and 7.

Also, in the second embodiment, the light conductive member 5A is provided with the light guiding member 21, so that not only the number of components but also the number of processes in assembling are reduced in comparison with the first embodiment in which the light guiding member 15 and the light conductive member 5 are separately formed. Thus, the productivity can be improved.

In the above-described first and second embodiments, a layer or a film for increasing reflection (means for increasing reflection, not shown) which improves light reflectance may be coated on or applied to the curve 20 of the light guiding member 15 or the curve 24 of the light guiding member 21, whereby the light beams from the light source can be guided satisfactorily toward the exit side thereby increasing the efficiency of using the light from the sport-like light source 6.

Figure 4:
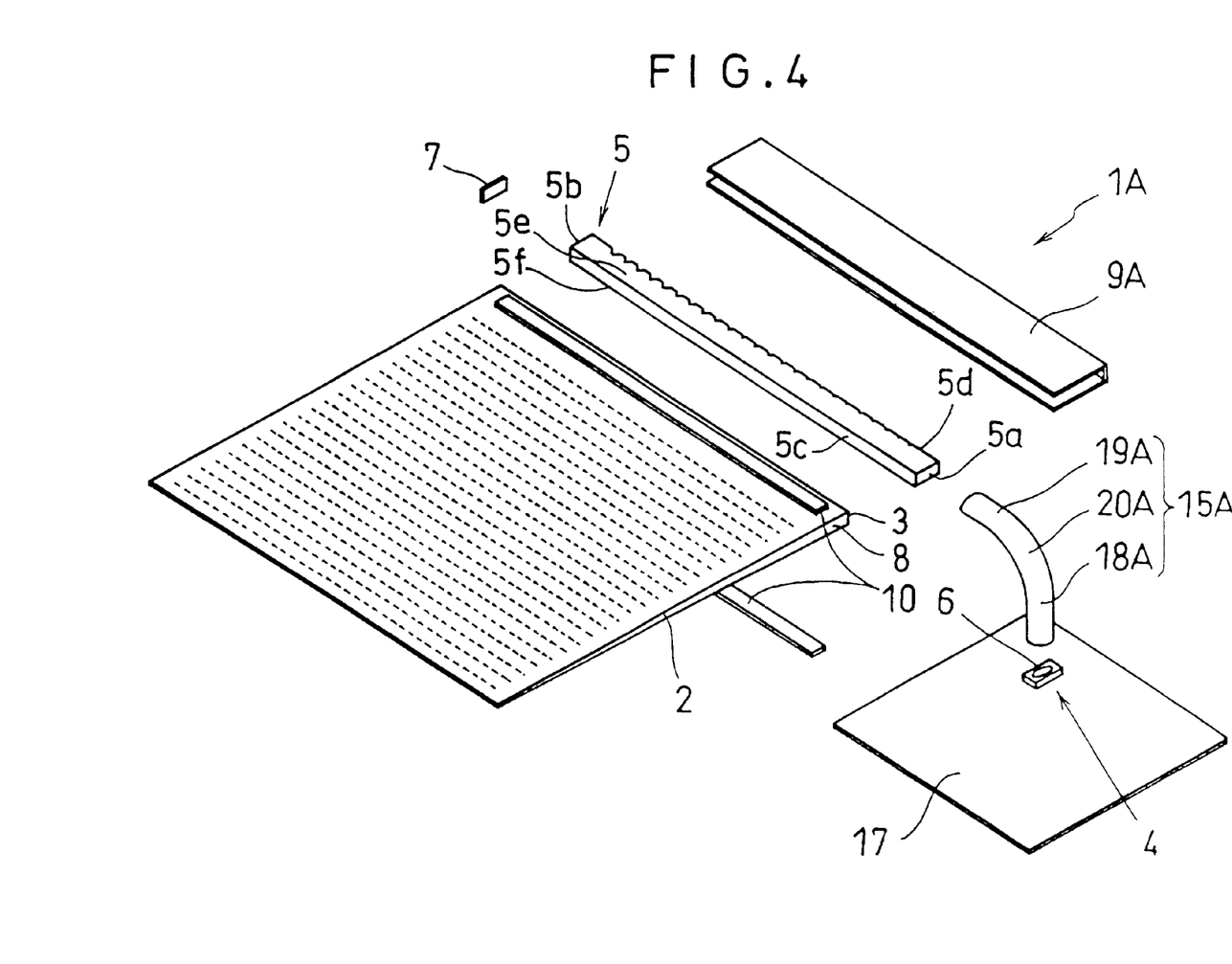
FIG. 4 is an exploded perspective view showing a spread illuminating apparatus according to a third embodiment of the present invention.
Figure 5:
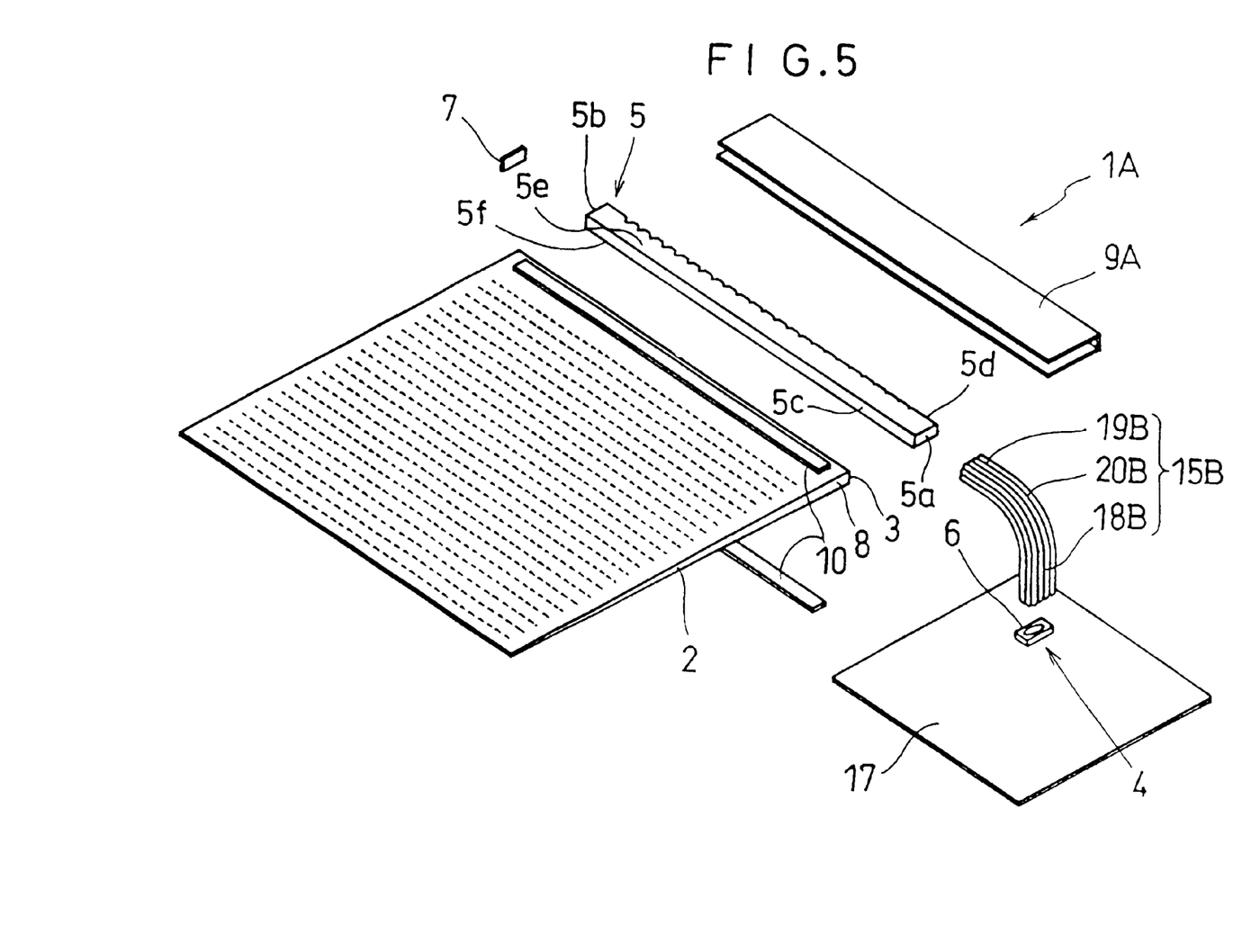
FIG. 5 is an exploded perspective view showing a spread illuminating apparatus according to a fourth embodiment of the present invention.

In addition, as shown in FIG. 4, a light guiding member 15A made of an optical fiber having a large diameter may be used instead of the light guiding member 15 in the first embodiment (hereinafter referred to as third embodiment). Alternatively, a light guiding member 15B made of a plurality of optical fibers each of which has a small diameter and which are tied up in a bundle may be used as shown in FIG. 5 (hereinafter referred to as fourth embodiment).

The light guiding member 15A is in general composed of a bar-like wing 18A provided facing the spot-like light source 6, a bar-like wing 19A provided facing the light conductive member 5 and a curve 20A connecting the wing 18A and the wing 19A as shown in FIG. 4. The light guiding member 15B which is made of a plurality of optical fibers tied up in a bundle is in general composed of a bar-like wing 18B provided facing the spot-like light source 6, a bar-like wing 19B provided facing the light conductive member 5 and a curve 20B connecting the wing 18B and the wing 19B as shown in FIG. 5.

In the third and fourth embodiments, as well as in the first embodiment, the light guiding members 15A and 15B are provided to guide the light beams from the spot-like light source 6. Accordingly, the spot-like light source 6 does not have to be disposed on the same plane as the light conductive member 5 and still the light beams from the spot-like light source 6 can enter the light conductive member 5. Therefore, the spot-like light source 6 can be disposed with reduced restrictions, thereby enabling the spot-like light source 6 and other electronic components (not shown) to be disposed together on the same electric wiring board 17. Accordingly, the circuit structure can be simplified, and thus the apparatus can be made compact in comparison with the above-described conventional art (FIGS. 6 and 7) in which separate wiring paths need to be provided.

According to the third and fourth embodiments of the present invention, the light guiding members 15A and 15B are made of optical fibers which are readily bent, and therefore are easy to manufacture. Thus, the productivity can be improved.

Further, in each of the above-described embodiments, one spot-like light source (spot-like light source 6) is used. However, the present invention is not limited thereto. For example, in addition to the spot-like light source 6 provided facing the end 5a of the light conductive member 5, a spot-like light source (not shown) may be disposed in place of the reflection plate 7 provided facing the other end 5b of the light conductive member 5 so as to provide a plurality of spot-like light sources.

Furthermore, in the embodiments of the present invention, the transparent substrate 2 is formed in a wedge-shape, in which the thickness is in inverse proportion to the increase in distance from the end surface 3 and gradually decreases. This construction is desirable for making the apparatus thinner and lighter in weight. Alternatively, the transparent substrate 2 may be constituted to have a uniform thickness.

According to the first aspect of the present invention, the light guiding member is provided between the end of the light conductive member and the spot-like light source to thereby guide light beams from the spot-like light source, so the light beams from the spot-like light source is adapted to enter the light conductive member even if the spot-like light source is not disposed on the same plane as the light conductive member. Therefore, the spot-like light source can be arranged with less restrictions, thereby enabling the spot-like light source to be disposed on an electric wiring board together with other electronic components. In the conventional art, it is difficult to dispose the spot-like light source on the electric wiring board together with other electronic components, and separate wiring paths have to be provided making the circuit structure complicated. On the other hand, according to the present invention, the spot-like light source and other electronic components may be disposed together on the same electric wiring board as described above, whereby the separate wiring paths, which have had to be provided in the conventional art, are no longer required. Thus the apparatus can be made compact.

According to the second aspect of the present invention, the light guiding member is integrally formed with the light conductive member so that not only the number of components but also the number of processes in assembling can be reduced. Thus the productivity can be improved.

According to the third aspect of the present invention, since the light guiding member and the light conductive member are separately formed, the variation of the position of the respective members can be accommodated by modifying only the shape of the light guiding member with the shape of the light conductive member kept intact. Therefore, the light conductive member can be standardized and thus the productivity can be improved.

According to the fourth aspect of the present invention, the light guiding member is made of one or a plurality of optical fibers which are readily bent, and therefore is easy to manufacture. Thus the productivity can be improved.

According to the fifth aspect of the present invention, the light guiding member is provided with the means for increasing reflection so that light reflectance is improved. Thus the efficiency of using light from the spot-like light source can be improved.

What is claimed is:

1. A spread illuminating apparatus comprising: a transparent substrate made of a light transmissible material and disposed over a screen of a reflection-type liquid crystal display element, and a bar-like light source composed of a light conductive member made of a transparent material and disposed close to and along at least one end face of said transparent substrate, and a spot-like light source disposed on an electric wiring board, wherein a light guiding member guiding light is provided between an end of said light conductive member and said spot-like light source, said light guiding member provided with a means for increasing reflection which improves light reflectance.

2. A spread illuminating apparatus comprising: a transparent substrate made of a light transmissible material and disposed over a screen of a reflection-type liquid crystal display element: and a bar-like light source composed of a light conductive member made of a transparent material and disposed close to and along at least one end face of said transparent substrate, and a spot-like light source disposed on an electric wiring board, wherein a light guiding member guiding light is provided between an end of said light conductive member and said spot-like light source, said light guiding member formed integrally with said light conductive member and provided with a means for increasing reflection which improves light reflectance.

3. A spread illuminating apparatus comprising: a transparent substrate made of a light transmissible material and disposed over a screen of a reflection-type liquid crystal display element: and a bar-like light source composed of a light conductive member made of a transparent material and disposed close to and along at least one end face of said transparent substrate, and a spot-like light source disposed on an electric wiring board, wherein a light guiding member guiding light is provided between an end of said light conductive member and said spot-like light source, said light guiding member formed separately from said light conductive member and provided with a means for increasing reflection which improves light reflectance.

* * * * *